No. 838,047. PATENTED DEC. 11, 1906.
I. F. NICHOLS & D. W. H. GILLILAND.
MIRROR.
APPLICATION FILED MAR. 26, 1906.
2 SHEETS—SHEET 2.
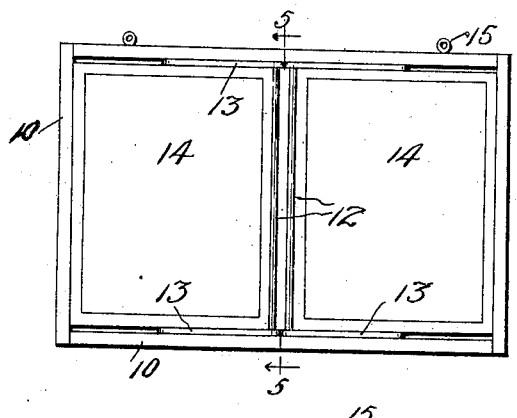
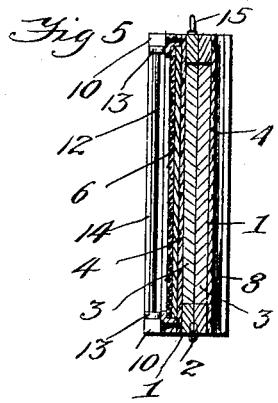
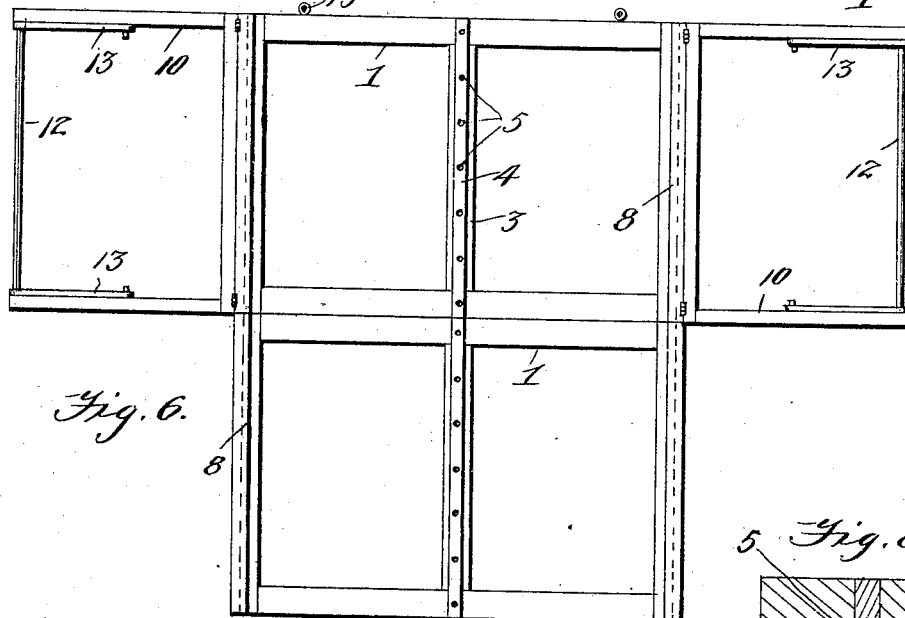
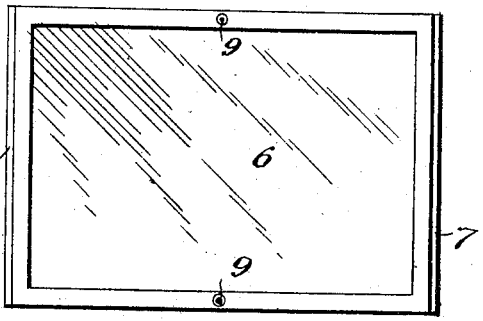
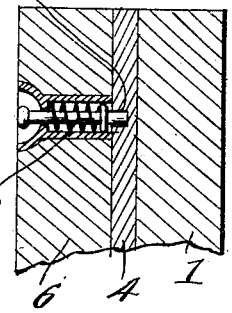
Witnesses
J. A. Griesbauer Jr.
C. H. Griesbauer.
Inventor
I. F. Nichols and
D. W. H. Gilliland
by H. B. Willson & Co.
Attorneys

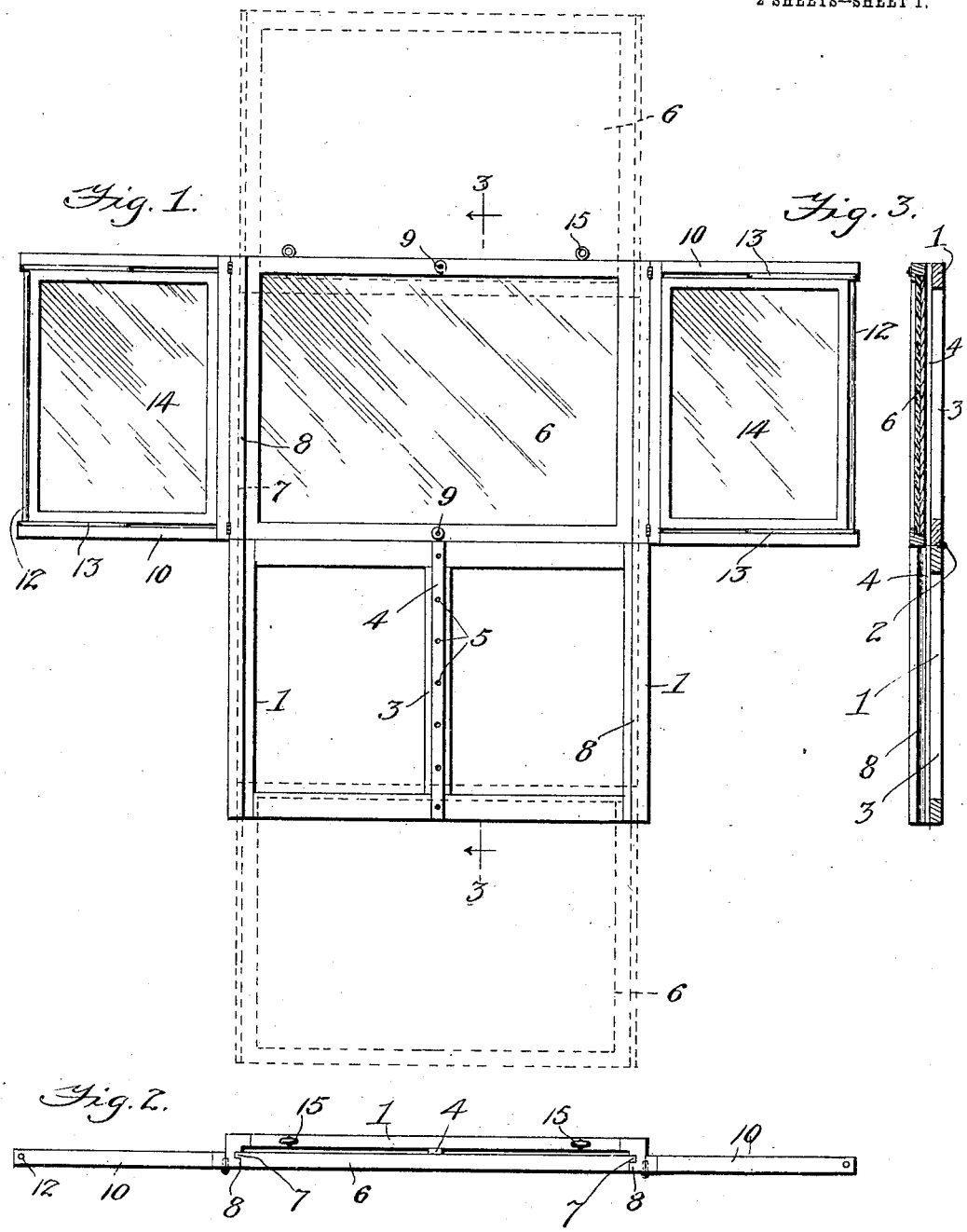

UNITED STATES PATENT OFFICE.

IRA F. NICHOLS AND DAVID W. H. GILLILAND, OF NEWARK, OHIO.

MIRROR.

No. 838,047.      Specification of Letters Patent.      Patented Dec. 11, 1906.

Application filed March 26, 1906. Serial No. 308,023.

*To all whom it may concern:*

Be it known that we, IRA F. NICHOLS and DAVID W. H. GILLILAND, citizens of the United States, residing at Newark, in the county of Licking and State of Ohio, have invented certain new and useful Improvements in Mirrors; and we do declare the following to be a full, clear, and exact description of the invention, such as will enable others skilled in the art to which it appertains to make and use the same.

This invention relates to improvements in adjustable folding mirrors.

The object of the invention is to provide a mirror of this character formed in sections, one of said sections being adapted to be adjustably supported, whereby the same may be arranged at different levels, and means whereby the other sections of the mirror are hingedly and pivotally supported to be swung to various angles in the same horizontal plane.

A further object is to provide a mirror of this character and a supporting mechanism therefor which will be simple, strong, and durable in construction and which may be readily folded up into compact form for transportation.

With the above and other objects in view the invention consists of certain novel features of construction, combination, and arrangement of parts, as will be hereinafter described and claimed.

In the accompanying drawings, Figure 1 is a front view of the mirror in an unfolded or open position, showing in full and dotted lines some of the positions to which the sliding section of the mirror may be adjusted. Fig. 2 is a top plan view of the parts arranged as shown in Fig. 1. Fig. 3 is a vertical sectional view through the main portion of the mirror and its supporting-frame, taken on line 3 3 of Fig. 1. Fig. 4 is a front view of the mirror in folded position. Fig. 5 is a vertical sectional view of the same, taken on line 5 5 of Fig. 4. Fig. 6 is a front view of the frame with the sliding mirror-section removed. Fig. 7 is a rear view of the sliding mirror removed from the frame, and Fig. 8 is an enlarged fragmentary sectional view through a portion of the mirror and the center stile and apertured supporting-bar of the frame.

Referring more particularly to the drawings, 1 denotes the supporting-frame, which preferably consists of two open rectangular sections arranged one above the other and hinged together at their meeting edges, as shown at 2. The upper and lower bars of each section of the frame are provided with a centrally-disposed vertical stile or brace-bar 3. Secured to the stiles 3 by screws or other suitable fastening means are supporting-bars 4, said bars being arranged in alinement, so as to form practically a continuous bar. In the bars 4 are formed a series of apertures 5, which provide means for adjustably supporting the sliding section of the mirror 6 upon said frames.

The vertical side edges of the frame of the mirror-section 6 is provided with guide flanges or tongues 7, adapted to be slidably engaged with grooves 8, formed in the side bars of the supporting-frames 1, as shown. On the back of the upper and lower strips of the mirror-section 6 are arranged centrally-disposed spring-catches 9, adapted to be engaged with the apertures 5 in the supporting-bar 4 to hold said mirror in its various positions on the frame 1, thereby permitting the mirror-section to be adjusted to any desired level.

Hingedly connected at their inner edges to the sides of the upper frame-section 1 are swinging supporting-frames 10, the upper and lower bars of which are connected at their outer ends by a vertically-disposed rod or bar 12. Pivotally mounted on the bar 12 adjacent to the inner edges of the upper and lower bars of the frames 10 are mirror-supporting arms 13, between the outer ends of which are pivotally-mounted swinging mirror-sections 14. Said sections 14 are pivotally connected to the inner ends of the arms 13 in any suitable manner to permit the same to swing in a horizontal plane. The pivotal connection of the outer ends of the arms 13 with the rods or bars 12, together with the pivotal connection of the inner ends of the arms with the mirror-sections 14, will permit said mirror-sections to be swung and turned in any desired angle, thus facilitating the use of the mirror.

The mirror-frame 1 may be supported in any suitable manner, but is here shown as provided with eyes or rings 15, secured to the upper cross-bar of the upper frame-section, whereby said frame may be engaged with hooks or other suitable supporting devices.

When not in use, the supporting-frames of the swinging mirror-sections may be folded inwardly upon the sliding mirror-section on the upper section of the supporting-frame, and the lower section of said frame may be folded up upon the back side of the upper section, thus forming a compact package with the glass portions of the mirror covered, so that the device may be readily transported without danger of being broken.

From the foregoing description, taken in connection with the accompanying drawings, the construction and operation of the invention will be readily understood without requiring a more extended explanation.

Having thus described our invention, what we claim as new, and desire to secure by Letters Patent, is—

1. A mirror comprising a supporting-frame formed of sections arranged one above the other, and hinged together at their meeting edges, alined, apertured supporting-bars on said sections, and a mirror-section having means for engaging said apertured bar to adjust it vertically thereon.

2. A mirror of the character described comprising a supporting-frame having upper and lower foldable sections hinged together at their meeting edges, the side bars of said frame-sections having guides, alined apertured supporting-bars secured to said upper and lower sections, a vertically-adjustable mirror-section slidably mounted in said guides, and means arranged on said mirror-section to engage said apertured supporting-bars, thereby holding said mirror in its adjusted positions, substantially as described.

3. A mirror of the character described comprising a supporting-frame formed of hingedly-connected foldable sections, a vertically-adjustable mirror-section slidably mounted on said frame-sections, mirror-supporting frames hingedly connected to the side edges of one of said frame-sections, mirrors arranged in said supporting-frames, and means whereby said mirrors are pivotally mounted in the latter frames to permit the mirrors to be swung to any desired angle in a horizontal plane, substantially as described.

4. A mirror of the character described comprising a main supporting-frame formed in upper and lower hingedly-connected foldable sections, the sides of said frame-sections having guide passages or grooves formed therein, a vertically-adjustable mirror slidably engaged with said guide-passages, means to hold said mirror in its adjusted positions, mirror-supporting frames hingedly connected at their inner edges to the sides of said upper main-frame section, pivot rods or bars arranged in the outer ends of said hinged frames, mirrors arranged in said frames, and supporting-arms pivotally connected at one end to the upper and lower ends of said frames and at opposite ends to said pivot rod or bar whereby said mirrors may be swung to any desired angle, substantially as described.

5. A mirror of the character described comprising a main supporting-frame formed of upper and lower hingedly-connected, foldable sections, apertured supporting-bars secured in line with the center stiles or crossbars of said frame-sections, the side bars of said frame-sections having guides, a vertically-adjustable mirror adapted to slidably engage said guides, spring-catches arranged on the back of said mirror to engage the apertures in said supporting-bars, side mirror-supporting frames hingedly connected to the side edges of the upper main-frame section to permit said side frames to be folded onto said main-frame section, pivot rods or bars connecting the outer ends of the upper and lower bars of said side frames, mirror-supporting arms pivoted at their outer ends to said rods or bars, mirrors pivotally mounted between the inner ends of said supporting-arms, and means arranged on the upper section of said main supporting-frame whereby said frame may be hung up, substantially as described.

In testimony whereof we have hereunto set our hands in presence of two subscribing witnesses.

IRA F. NICHOLS.
DAVID W. H. GILLILAND.

Witnesses:
J. HOWARD JONES,
D. M. KELLER.